Jan. 20, 1970    F. J. DEBBRECHT ET AL    3,491,368
AUTOMATIC DISPENSING SYSTEM WITH FLUID PURGING MEANS
Filed May 10, 1968    3 Sheets-Sheet 1

INVENTORS
Frederick J. Debbrecht
Lawrence J. LaBarre
Gene E. Lightner
BY Mortenson and Weigel
ATTORNEYS

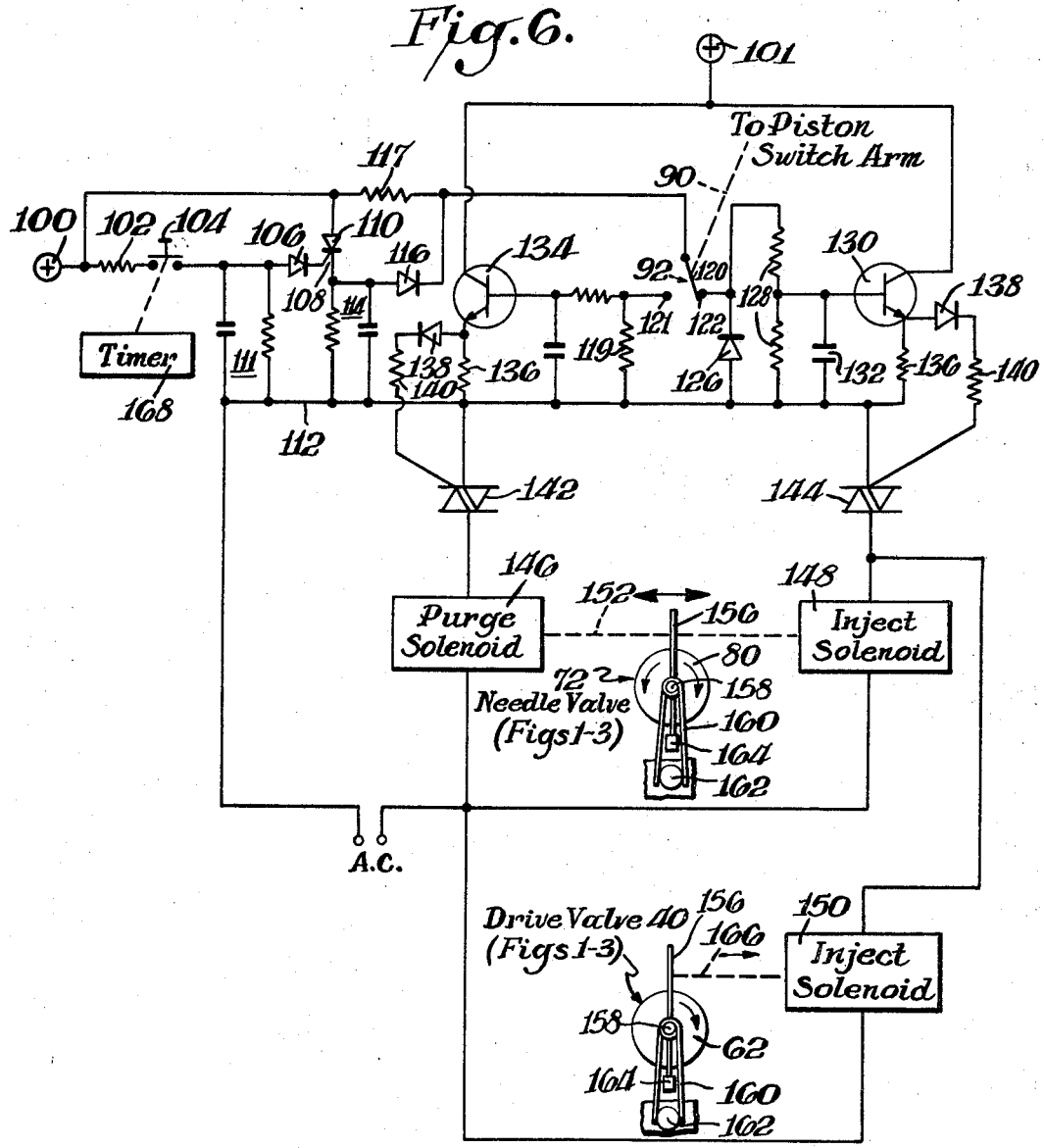

> United States Patent Office 3,491,368
Patented Jan. 20, 1970

3,491,368
AUTOMATIC DISPENSING SYSTEM WITH FLUID PURGING MEANS
Frederick J. Debbrecht, Wilmington, Del., Gene E. Lightner, Kennett Square, Pa., and Lawrence J. La Barre, Mountain View, Calif., assignors to Hewlett-Packard Company, Palo Alto, Calif., a corporation of California
Filed May 10, 1968, Ser. No. 728,258
Int. Cl. G04c 23/38
U.S. Cl. 222—70                14 Claims

ABSTRACT OF THE DISCLOSURE

A metering pump is adapted to dispense adjustable volume samples of fluid from a discharge orifice. The line between the metering pump and discharge orifice is broken by a three-way valve which in one position blocks all flow to the discharge orifice, in the second position permits flow through the discharge orifice from the metering pump, and in the third position permits the flow of a purge fluid from a purge line through the discharge orifice to purge the orifice and that portion of the line between the valve and orifice. A sensing mechanism in the metering pump controls the purge gas flow through the discharge orifice to a period of time proportional to the viscosity of the fluid. In this manner, accurate measured samples are quickly dispensed through the discharge orifice in a highly repeatable manner.

---

This invention relates to a system for accurately dispensing fluid samples and, more particularly, to a system for dispensing fluid samples with repeatable volumetric accuracy and in discrete time intervals.

BACKGROUND OF THE INVENTION

In analytical laboratories, whether related to the medical, biochemical, chemical or physiological sciences, it is frequently desirable to dispense fluid samples in a precisely accurate and repeatable manner. Often in the past, samples have been dispensed utilizing tedious manual techniques which are not only time consuming but somewhat inaccurate and difficult to obtain a high degree of repeatability. Good volumetric accuracy is particularly necessary for dose preparation in the medical field and sample injection in the gas chromatography field.

In gas chromatography, a sample of a fluid or specimen to be analyzed is introduced into an injection port where it is vaporized if necessary and entrained by a moving stream of carrier gas which passes the sample through a separating column. The column selectively retards different components of the sample under analysis. Because of the selective component retardation, the sample emerges from the column with its components separated in time. If these separated components are detected and/or trapped, the individual faction or components of the sample can be obtained in a highly purified state. Unfortunately, this gas chromatography technique is a batched type operation, hence, successive samples must be injected into the gas chromatograph and the separated fractions or components collected at the outlet each run.

Many devices have been built for introducing samples into a large or perparative scale chromatograph. To maintain the high degree of purity of the separated components, highly accurate and substantially identical sample quantities must be introduced each run. These consecutive samples should be as nearly identical in size, volume, or weight as possible so that the characteristics of the eluted components, i.e., the widths and heights of the eluted chromatograph peaks, will be substantially the same. It is from these elution peaks that the several fractions are collected by fractionating the successive samples and collecting a component quantity related to a predetermined peak area of the similar components in each run. If identical samples are not injected into the chromatograph, the different elution peaks have different heighths and widths and the degree of purity is degraded. These problems of repeatable accuracy in injecting the samples is of particular difficulty when using the smaller scale analytical equipment. Here samples are injected having volumes of fractions of a microliter.

Various systems have been devised in the past for the purpose of handling automatic injections. One such system is disclosed in U.S. Patent 3,155,289 issued Nov. 3, 1964, to James M. Kauss. While capable of metering accurate sample quantities, a problem arises using the Kauss apparatus in that after the metering pump has injected the sample through an injection port or needle, the sample remaining in the needle or line leading to the injection port tends to ooze or dribble into the flow stream of the carrier gas. This creates additional problems. The sample is not only less accurate and repeatable since the dribble is uncontrollable, but also the injection occurs over a period of time rather than as a discrete slug over a short period of time as is desirable for optimum separation. Since this dribble is not controllable it causes diverse, unpredictable separations. Tailing of the peaks occurs, resulting in cross contamination of the sample components. Purity is degraded. It is highly desirable that a sharp, discrete slug sample injection be made in as short a time period as possible so as to not unduly disturb the gas flow stream.

To provide such sample injection is one of the objects of this invention.

Another object of this invention is to obviate many of the disadvantages of the prior art sample dispensing system.

BRIEF DESCRIPTION OF THE INVENTION

In accordance with a preferred embodiment of the invention, an automatic sample dispensing system includes a metering pump which is capable of discharging an adjustable volume of a fluid supplied from a fluid source. A discharge line connected to the metering pump passes the metered fluid from the pump to a discharge needle or orifice. A flow control means is interposed in the discharge line and functions first to pass the metered fluid through the discharge orifice and then to purge the discharge orifice for a period of time proportional to the viscosity of the fluid sample. This improves the volumetric accuracy of the sample by ensuring the fluid is cleaned out of the system and yet does not disturb the flow or separating ability of a gas chromatographic analysis system, for example.

BRIEF DESCRIPTION OF THE DRAWINGS

The novel features that are considered characteristic of this inevntion are set forth with particularity in the appended claims. The invention itself, however, both as to its organization and method of operation as well as additional objects and advantages thereof will best be understood from the following description when read in connection with the accompanying drawings, in which:

FIGURE 6 is a partial circuit schematic and partial block diagram of the electronic control circuit which controls the operation of the solenoid operated valves illustrated in FIG. 1.

DESCRIPTION OF THE PREFERRED EMBODIMENT

Figure 1:
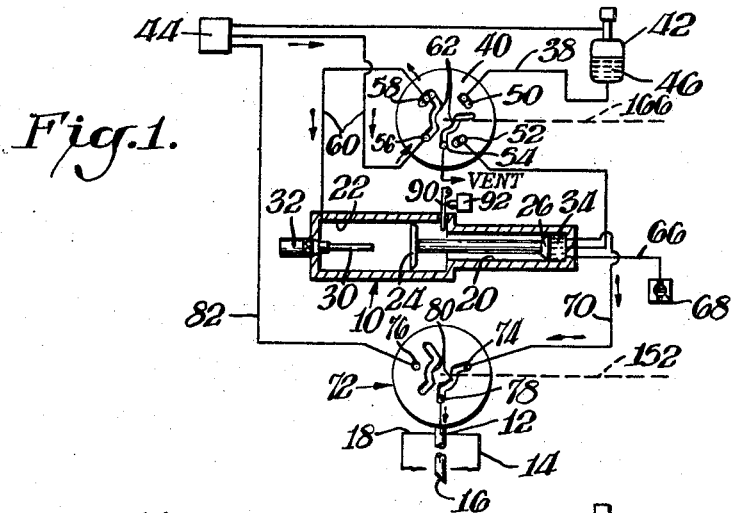
FIGURES 1-3 are schematic flow diagrams of the automatic sample dispensing system of this invention shown in each of three different operating conditions: inject, purge and refill, and neutral, respectively.

The system of this invention may be most easily understood by reference to the schematic flow diagram of FIG. 1 which shows the various flow control means in the inject phase of the cycle. In this phase a sample from a metering pump 10 is injected through a dispensing tube 12 into a container represented by the partial block 14. The container 14 may be a vial, bottle or the input of an analytical system such as the injection block of a gas chomatograph. In the case where the container 14 symbolizes the injection block of a gas chromatograph, carrier gas from a source flows into the injection block to sweep any sample, injected by the tube 12 and vaporized in the injection block, through a separating column (not shown). The tube 12 has an orifice 16 which may be sharpened to facilitate its penetration of the elastomeric septum material which normally is employed in the injection block to facilitate sample introduction and to seal the flow system of the gas chromatograph from the atmosphere. The septum itself is not illustrated but is symbolized by the top line 18 of the box 14. When used in a gas chromatograph, the tube 12 may be either a syringe type needle or may be directly coupled to the injection block.

The metering pump 10 illustrated here as a double acting piston dispenser, includes a metering cylinder 20, a drive cylinder 22, a drive piston 24 and a metering piston 26. The drive cylinder 22 is illustrated as having greater diameter than the metering cylinder 20 for reasons that will be understood from the following description but may be of the same or smaller diameter. The two pistons 24 and 26 are operatively connected together to move in a reciprocal manner in unison within their respective drive and metering cylinders 22 and 20.

The outside end of the drive cylinder 22 (the lefthand end in the drawing) has included therein an adjustable rod 30 so as to limit the back stroke of the drive piston 24. The shaft 30, which is adjustable along the axis of the drive cylinder 22, may be the end of a micrometer 32. Any other suitable screw type device may be used as well, but a micrometer is preferred because of its precision of adjustment. The chamber 36 formed by the metering cylinder 20 and the metering piston 20 is termed the metering chamber. By adjusting or limiting the back stroke of the drive piston 24, and, hence, the length of the forward stroke of the metering piston 26, the amount of fluid that may be contained within the metering chamber 36 is determined. The drive piston 24 (and hence the metering piston 26) is shown in its full back position in the drawing of FIG. 3 immediately prior to its inject stroke. The system is said to be in a neutral condition.

The metering chamber 36 is filled through an orifice in the end face of the metering cylinder 20 by a fluid feed line 38. The fluid feed line 38 couples a pressurized sample fluid reservoir 42, which receives its gas pressure from a source of carrier gas 44, through a two position, five port solenoid actuated valve 40. The carrier gas may be any suitable pressurized gas which will not contaminate the sample or, in the case of chromatography, which will not react with the sample or separating column. In gas chromatography typical gases are nitrogen, helium, or hydrogen. The pressurized sample reservoir 42, although illustrated as being pressurized by the source of carrier gas 44, may be a self-contained pressurized sample bomb in which the sample fluid 46 is stored under pressure.

The fluid feed line 38 is connected between the first port 50 of the valve 40 and the sample reservoir 42 and again between the second valve port 52 and the metering chamber 36 to complete the fluid feed from the sample reservoir 42 to the metering chamber 36. The third port, in a clockwise sense about the valve 40, is designated 54 and is connected to atmosphere or vent as denoted by the arrow. The last two ports of the valve 40 are designated 56 and 58, respectively, and with the valve 40 in the position shown in FIG. 1, interconnect carrier gas from the source 44 to the drive cylinder 22 through a drive gas line 60. The drive gas and feed lines may be any suitable tubing capable of withstanding the fluid pressures involved. Stainless steel tubing is preferred.

The valve 40 may be any suitable two position or other solenoid actuated valve capable of interconnecting pairs of lines together and may be similar in construction to that described, for example, in the Waston et al. Patent 2,757,541 issued Aug. 7, 1956. Valves of this type are available commercially from Hewlett-Packard Company, Avondale, Pa.

As is typical valve 40 includes a body or stator portion in which the ports 50, 52, 54, 56 and 58 are formed. A grooved disc or rotor, denoted schematically by the grooves 62, preferrably made of an inert self-lubricating plastic such as tetrafluoroethylene, sold under the trademark "Teflon," effects the switching action to disconnect or interconnect various pairs of the ports 50, 52, 54, 56 and 58 in the valve body. The grooved rotor 62 is rotated to perform this selective interconnection. The rotor 62 in the rotary position of FIG. 1 interconnects the ports 56 and 58 which are in the drive gas line 60. Rotation of the rotor 62 from its extreme clockwise rotational position illustrated in FIG. 1 to its extreme counterclockwise rotational position illustrated in FIGS. 2 and 3 changes the interconnection. Thus in FIGS. 2 and 3 the rotor 62 interconnects the fluid feed lines 38 to permit flow from the sample reservoir 42 to the metering chamber 36 and simultaneously permits any gas from the drive cylinder 22 to escape through the drive gas line 60, port 58 and the vent port 54 to the atmosphere.

The metering chamber 36 also is connected through a drain line 66 and a drain cock 68 to a waste receptacle. It may be used for purposes of cleaning the metering chamber. In like manner, a discharge line 70 is connected from the metering chamber 36 through a second fluid flow control valve, designated as needle valve 72, to the dispensing tube 12 and exhaust or dispensing orifice 16. The needle valve 72 is similar in construction to the valve 40 but in this case is a three position, three-port valve in which the grooved rotor 80 functions to interconnect either or neither of the first two ports 74 and 76, respectively, to the third outlet port 78 of the valve stator. The third port 78 is connected to the dispensing tube 12. The grooved rotor 80 in its extreme clockwise rotational position, illustrated in FIG. 1, connects the discharge line 70 to the dispensing tube 12 and discharge orifice 16. A purge gas line 82 is connected between the carrier gas source 44 and the second port 76. Flow through this line is blocked. This position of the needle valve 72 is designated the inject position.

Figure 2:
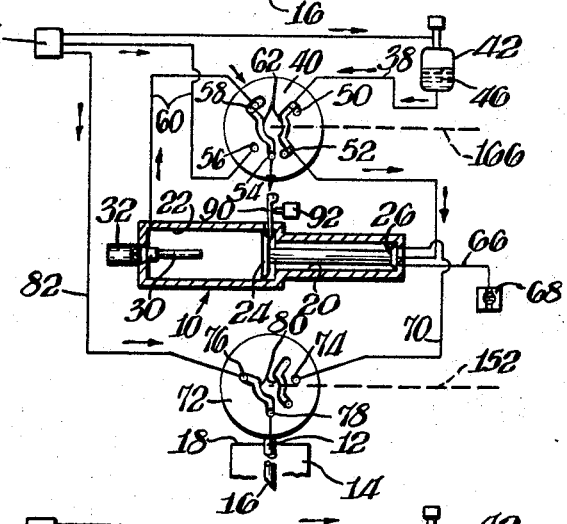
Figure 3:
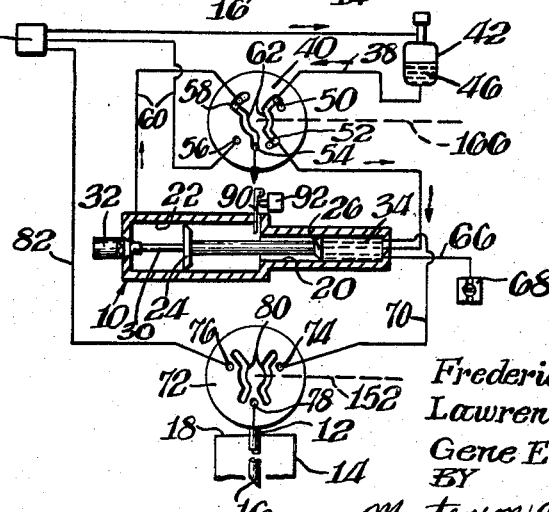

In FIG. 2 the rotor 80 of the needle valve 72 is in its extreme counterclockwise rotational position. It functions to block gas flow through the discharge line 70, but permits gas flow through the purge gas line 82, and the dispensing tube 12 to the dispensing orifice 16. The third position of the needle valve 72 is illustrated in FIG. 3 with the grooved rotor 80 of the valve 72 in its neutral position between the two extreme rotational positions illustrated in FIG. 1. In this neutral position of the rotor 80, flow through both the discharge line 70 and the purge gas line 82 is blocked.

In accordance with this invention, a sensing device is associated with a metering pump 10 to purge the dispensing tube 12 and dispensing orifice 16 for a period of time proportional to the sample viscosity. This sensing device, in a preferred embodiment, includes an actuating arm 90, which functions to open and close a microswitch 92. This arm 90 is positioned within the drive cylinder 22 of the metering pump 10 to sense the rate at which the drive piston 24 refills the metering chamber 36. With a constant driving force, the rate is a function of the viscosity of the fluid 46. This rate function is used to control the purge time of the dispensing tube 12 and discharge orifice 16. Purge gas flow is initiated, as is described in the co-pending patent application of Frederick J. Debbrecht, Ser. No. 728,257 filed May 10, 1968, immediately upon the completion of the injection of the fluid sample. Completion of the injection is sensed by the microswitch 92 when the drive piston 24 and, hence, the metering piston 26 reach the end of their stroke, i.e., when substantially all of the fluid in the metering chamber 36 is expelled.

The actuating arm and microswitch 90, 92, respectively, are adjustable as will be described in conjunction with FIGS. 4 and 5 such that the purge time may be varied. The adjustment is made by adjusting the axial position of the microswitch 92 relative to the drive cylinder 22. As the drive and metering pistons 24 and 26, respectively, move leftward in the drawing during the refill portion of the cycle in which fluid is drawn into the metering chamber from the sample reservoir 42, the microswitch 92 will open a short period of time later. This time required for the microswitch to open after the fluid is exhausted from the metering chamber 36 is a function of the adjustment of the microswitch 92, of course, but more importantly is a function of the rate at which the pistons 24 and 26 are permitted to move leftward in the drawing. This rate of movement of the pistons is determined primarily by the viscosity of the fluid in the sample reservoir 42 which is moving through the feed line 38 and into the metering chamber 36. This variable time is employed to control the time interval during which purge gas is permitted to flow through the purge gas line 82 to purge the dispensing tube 12 and the dispensing orifice 16. The adjustment is made so that the purge time is sufficient to clear the dispensing tube 12 and discharge orifice 16 of fluid. Once the adjustment is made for a given fluid, the purge time increases or decreases according to fluid viscosity such that sufficient purge gas flows to clear the needle and then flow stops. This avoids undue disturbance of the carrier gas flow through a chromatograph, for example.

One circuit that has been used successfully to perform this control function and to actuate or drive the rotors 80 and 62 of the respective drive valve 40 and needle valve 72 is illustrated in FIG. 6. Other circuits can be used as desired. The circuit illustrated includes a source of direct current (D.C.) supply voltage 100 which is coupled through a series connected resistor 102, a push button switch 103, and the anode of a silicon diode 106 to the gate electrode 108 of a silicon controlled rectifier 110. The anode of the controlled rectifier 110 is connected to a second D.C. supply source 101. An R-C filter network 111 is connected from the junction between the switch 104 and diode 106 to a common line 112. The cathode of the controlled rectifier 110 is connected through a second R-C filter circuit 114 to the common line 112 and through the forward conducting direction of a second diode 16 to the common terminal of the microswitch 92 (FIG. 1). A resistor 117, preferably 10,000 ohms, is connected from the anode of the controlled rectifier 110 to the common electrode of the microswitch 92.

The armature 120 of the microswitch 92 is shown in its normally closed position, that is, when the switch arm 120 is released by the back or refill stroke of the drive piston 24 (FIG. 1) such that it is in contact with the normally closed terminal 122. The switch also has a normally open terminal or contact 121 which is closed by the forward or injection movement of the drive piston 24 coming in contact with the drive arm 90 (FIG. 1). The normally closed microswitch contact 122 is connected through the cathode of a third diode 126 to the common line 112 and through a pair of series connected voltage dividing resistors 128 to the same common line 112. The junction point between the series connected voltage dividing resistors 128 is connected to the base electrode of an NPN transistor 130 and through a capacitor 132 to the common line 112. The voltage dividing resistors 128 each have a value roughly one fifth that of the series resistor 117 (in this case of 2.2 thousand ohms) to form a voltage dividing network with the resistor 117 which is not sufficient to cause conduction of the transistor 130. The transistor 130 has a collector electrode which is connected to a source of potential 101 as is the collector electrode of a second NPN transistor 134. The emitter electrodes of each of the transistors 130 and 134 are connected through respective emitter resistors 136 to the common line 112 and in the forward conducting direction through respective series connected diodes 138 and resistors 140 to the respective firing electrodes of triacs 142 and 144, respectively, or other similar current control device. Back-to-back connected silicon controlled rectifiers could be substituted for the triacs.

The triacs 142 and 144, respectively, are connected between the common line 112 and the A.C. power input terminals of the purge solenoid illustrated by the box 146 and the inject solenoid illustrated by the box 148. The second triac 144 in addition to being connected to the power input terminals of the inject solenoid 148 is also connected to the power input terminals of a second inject solenoid 150. The several solenoids employed are conventional and in the presence of a power signal such as an alternating current signal derived from either of the triacs 142 or 144, tend to move their respective actuating arms in one direction or the other. The actuating arms of the purge and inject solenoids 146 and 148 are connected together by a mechanical linkage as illustrated by the dashed line 152 such that if the inject solenoid 148 is energized, the linkage 152 will move to the right in the drawing and conversely, if the purge solenoid 146 is energized, the linkage 152 will move to the left in the drawing. This linkage 152 in turn is mechanically coupled, as by pins inserted in the linkage, to a crank arm 156 which is keyed to rotate the drive shaft 158 of the rotor 80 of the needle valve 72 (FIG. 1). To rotate the needle valve 72 to the extreme clockwise position illustrated in FIG. 1, the first inject solenoid 148 is energized. Conversely, to rotate the needle valve 72 to its extreme counterclockwise position illustrated in FIG. 2, the purge solenoid 146 is energized.

Finally, to cause the rotor 80 to assume its neutral position illustrated in FIG. 3, neither solenoid 146 or 148 is energized. Instead, a tension spring 160 (FIG. 6) which is coiled about the drive shaft 158, returns the linkage 152 to a center or neutral position. The crank arm 156 extends through the drive shaft 158 and it is bent as at 164 to extend outwardly from the plane of the drawing between the spring members 160. If either the first inject solenoid 148 or purge solenoid 146 is energized, their movement rotates the crank arm 156 and its bent portion 164 to place one or the other of the arms of tension spring 160 under tension. When the power to the energized solenoid is removed, the spring arm 160 under tension returns the crank arm 156 to the upright or neutral position seen in FIG. 6. This position corresponds to the neutral position of FIG. 3 of the rotor.

The drive valve 40 is similar in construction and is driven by the inject solenoid 150 to the right in the drawing through the mechanical linkage illustrated by the dashed line 166. The remaining parts of the drive valve 40 are similar to those of the needle valve 72 and hence need not be described. Suffice it to say that the inject soleoid 150, when energized, causes the drive valve 40 to assume its extreme clockwise rotational position illustrated in FIG. 1 and when de-energized the drive valve 40 is driven by its tension spring 160 back to its neutral position illustrated in FIGS. 2 and 3.

DESCRIPTION OF THE SYSTEM OPERATION

Initially both transistors 130 and 134 are non-conducting. None of the solenoids 146, 148 or 150 are energized and the situation illustrated in FIG. 3 prevails, i.e., both valves 40 and 72 are in their neutral position. In this neutral position, the sample fluid 46 in the sample reservoir 42, under pressure from the carrier gas source 44, flows through the first and second ports 50 and 52 of the drive valve 40 and feed line 38 to fill the metering chamber 36 of the metering pump 10. The backside of the drive cylinder 22 is opened through drive gas line 60 and the third and fifth ports 54 and 58 of the drive valve 40 to atmosphere or vent. Hence, with the fluid pressure of the sample fluid 46 acting even on the metering piston 26, the double piston assembly 24–26 moves to the left in the drawing and fills the metering chamber to the extent permitted by the adjustment of the adjusting screw or micrometer 32.

To initiate a sample injection, an electric signal is applied to the control electrode of the controlled rectifier 110. In the illustrated embodiment the signal is derived from the push button switch 104 which is depressed manually. Alternatively the switch 104 contacts may be closed as by a timer 168 which may periodically depress the switch to initiate another sample injection. In lieu of the timer 168, the pushbutton switch 104 or the switch 104 terminals may be closed at predetermined times after the return of the armature 120 of the microswitch to its normally closed contact 122 signifying a substantial completion of an injection.

In any event, once the pushbutton switch 104 is closed, the first controlled rectifier 110 or similar current control device is triggered so that current now flows from the positive supply 100 through the isolating diode 116, the microswitch 92 normally closed contact 122 and the voltage dividing resistors 128. The conduction of the controlled rectifier 110 and diode 116 thus effectively by-pass the resistor 117. When in the circuit, the resistor 117 acting with the voltage divider 128, biases the transistor 130 into a non-conducting state. With the resistor 117 now by-passed, the full supply voltage is applied across the voltage divider 128 and the transistor 130 conducts thereby triggering the second triac 144 for the inject solenoids 148 and 150 through the diode 138. The two inject solenoids 148 and 150, respectively are energized and rotate the rotors 80 and 62 of the needle valve 72 and drive valve 40, respectively, to their extreme clockwise positions illustrated in FIG. 1. The sample injection or dispensing now begins.

During the injection phase, the sample reservoir 42 is disconnected from the system by the rotation of the drive valve's rotor 62. Simultaneously, the carrier gas source 44 is connected through the drive gas line 60 and the fourth and fifth ports 56 and 58 of the drive valve 40 to the drive cylinder 22. The face of the drive piston 24, having a greater surface area than that of the metering piston 26, drives fluid from the metering chamber 36 through the discharge line 70 to the needle valve 72. Such fluid passes through the input port 74 out through the outlet port 78 and thence through the dispensing tube 12 and discharge orifice 16 into the chromatograph system or other container denoted by the block 14.

As the drive piston 24 completes its travel, to the right in the drawing, the switch arm 90 is moved causing the armature 120 of the microswitch 92 to move from the normally closed contact 122 to the normally open contact 120 (FIG. 6). This movement of the armature 120 breaks the circuit of the controlled rectifier 110 and it ceases conduction. The resistor 117 is no longer by-passed and the first transistor 130 ceases conduction because of the drop in its base voltage. Simultaneously therewith the voltage divider formed by the resistor 117 and the resistor 119 biases the second transistor 134 into conduction. The resistor 119 has a resistance value roughly ten times that of the resistor 117.

With the conduction of the second transistor 134, the purge and refill cycle is initiated. The triac 142 is energized which in turn energizes the purge solenoid 146 to rotate the rotor 80 of the needle valve 72 to its extreme counterclockwise position. The drive valve 40 simultaneously is allowed to return by its spring 160 to its neutral position illustrated in FIGS. 2 and 3. In this purge and refill phase, flow through the discharge line 70 is blocked by the needle valve 72, but flow again resumes through the feed line 38 and drive valve 40 to refill the metering chamber 36. With the valves in this position, as described previously, the drive cylinder 22 is opened to the atmosphere so that the pistons 24 and 26 move to the left as the metering chamber refills. Carrier gas from the source 44 passes through the rotor 80 of the needle valve 72 to the dispensing tube 12 and discharge orifice 116. Hence, carrier gas flow flushes out or purges the discharge tube 12 and its dispensing orifice 16 of any remanant fluid which was left therein. This purging occurs substantially immediately after the injection cycle such that the entire volume of sample is quickly expelled from the dispensing orifice 16 into the container or gas chromatograph system substantially as a slug. This feature of immediately purging the needle is described and claimed in the said co-pending Debbrecht application.

In accordance with this invention the rate of movement of the pistons 24–26 during refill phase is sensed by the microswitch 92 thereby to control the time duration of the purge. After the piston 24 has moved a finite distance (to the left in the drawing) during refill, the armature 120 of the microswitch 92 again returns to its normally closed contact 122. Typically, there is some hysteresis in the microswitch so that the microswitch armature 120 recloses to contact 122 at a special point to the left in the drawing of the point at which it opened. In a typical operation, the switch closes 0.003 in. prior to the end of the piston injection stroke—system inertia carries it the rest of the way. The switch opens from contact 121 some 0.008 in. from the end of the injection stroke during purge and refill. The second transistor 134, no longer being biased—the switch contact 121 is again open—censes conduction and the triac 142 is disabled. The needle valve 72 again returns to its neutral position and the condition of FIG. 3 of the drawing prevails. The metering chamber 36 continues to refill through the feed line 38. Purge gas no longer flows through the needle valve 72 since its flow is now blocked by the return of the rotor 80 to its neutral position.

The advantages of controlling the purge time of the dispensing tube and discharge orifice 16 to a period of time proportional to the viscosity of the fluid to be dispensed has many advantages. To begin with it insures that thorough purging occurs but yet a purging which is no longer than necessary for the particular fluid being used. Thus for the more viscous fluids, a longer purge time is employed than for the less viscous. This insures and enhances the repeatability of the accurately metered quantities of fluid which are injected during each injection cycle of the system. Carrier gas flow in the chromatograph is undisturbed.

Figure 4:
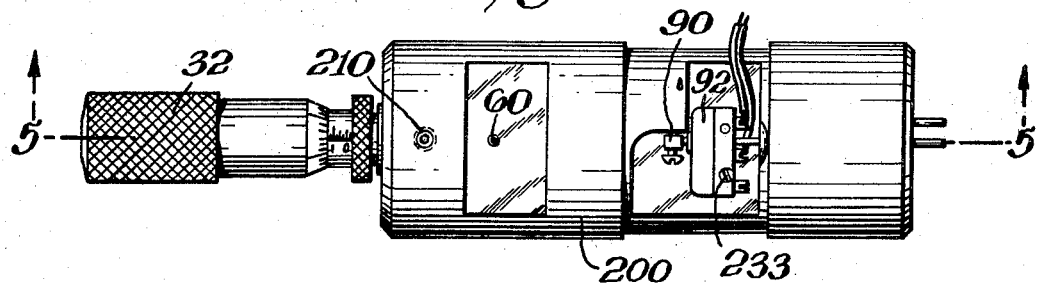
FIGURE 4 is a pictorial view of the metering pump including a device for sensing the position of the dispensing piston.
Figure 5:
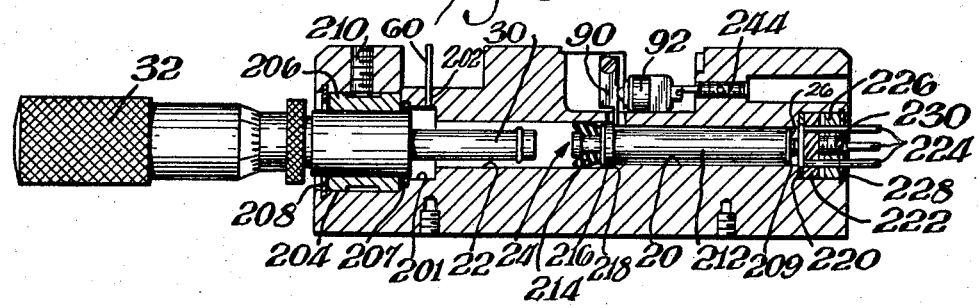
FIGURE 5 is an axial cross-sectional view of the metering pump taken along the section line 5—5 of FIG. 4.
Figure 7:
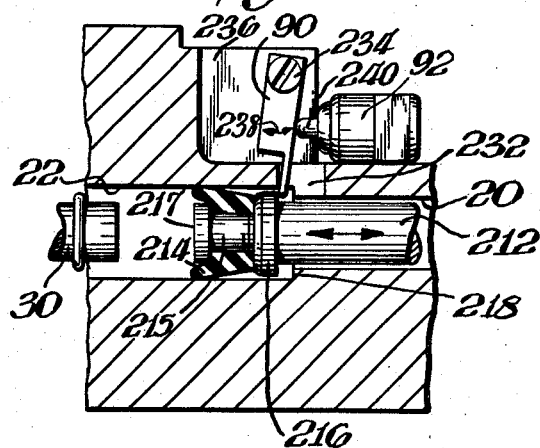
FIGURE 7 is an enlarged view of a portion of the cross-sectional view of FIG. 5 showing the particular relationship between the actuating arm of the sensing micro-switch and the drive piston of the metering pump.

A preferred construction of the metering pump 10 is illustrated in FIGS. 4, 5 and 7 although it is to be understood that any metering pump with any sensing means for ascertaining the position of the pistons may be employed. In FIGS. 4 and 5 there is seen the micrometer 32 which is introduced into one end of a hollow cylindrical housing 200. The cylindrical housing 200 may be formed of any suitable material such as stainless steel and is bored to form the metering cylinder 20 and counterbored to form the drive cylinder 22. In turn, the outside end of the drive cylinder 22 is again counterbored as at 201 to accommodate the introduction through a radial bore 202 of gas from the drive gas line 60. The drive gas line may be any suitably stainless steel tubing and may be soldered or coupled by a conventional tubing connector into the counterbore 201. The counterbore 201 is again counterbored as at 204 to accommodate a sleeve clamp 206 which engages the periphery of the micrometer 32. The sleeve clamp 206 has an O-ring seal 207 at the inner end to seal the drive cylinder 22 and a retaining ring 208 at the other end inserted into an internal annular groove within the counterbore 204. The retaining ring retains the sleeve clamp which holds the micrometer 32 by a friction fit. A set screw 210 aids in positioning and securing the sleeve clamp 206 within the outer bore 204.

The metering piston 26 may be nothing more than an elastomeric sealing washer 209 or suitable sealing O-ring engaged to the end face of a connecting rod 212 which connects the metering piston 26 with the drive piston 24. The sealing washer 209 has a slightly larger diameter than the connecting rod 212. The drive piston 24 may comprise another elastomeric sealing washer or ring 214 (FIG. 7) mounted on a screw head 215 tapped into the end face of the connecting rod 212. A rigid flange 216 forms part of the screw head and provides a solid member to abut against the step 218 formed by the point of meeting between the metering cylinder 20 and the drive cylinder 22. The abutting step 218 and flange 216 determine the end of the piston discharge stroke. The screw head 215 also has an end flange 217 for retaining the drive cylinder washer 214. Other known seals for the pistons may be employed as desired.

The open end of the metering cylinder 20 is closed off by a flat elastomeric sealing washer 220 which is retained in place by an end disc or piece 222 in which are secured three tubes 224 connected respectively to the drain line 66, the discharge line 70 (FIG. 1), and the feed line 38 (FIG. 1). The flat washer 220 may be non-metallic whereas the end piece 222 preferably is of stainless steel or other rigid material. The end piece 222 is retained in position by a locking plate 226 held by an internal retaining ring 228 with a set screw 230 passing through the locking plate 226 to engage the end piece 222.

To accommodate the switch arm 90 of the microswitch 92, a radial bore 232 (FIG. 7) is formed at the junction or step 218 between the drive and metering cylinders 20 and 22, respectively. At this point a peripheral portion of the cylindrical member 200 is cutaway to provide a planar portion 236 lying in a plane substantially intersecting the axis of the bores in the cylinder 200. The switch arm 90 is pivoted as by a screw 234 attached to the planar portion 236 to permit a pendulum motion of the arm 90 as denoted by the arrow 238. When the drive piston 24 during its power stroke reaches the point illustrated in FIG. 7, its flange 216 engages the arm 90 and moves it against the pin 240 of the microswitch 92. The microswitch itself is pivotably mounted at one edge by a screw 233 (FIG. 4) tapped into the cylinder 200. The inward movement of the pin 240 moves the contact arm 120 (FIG. 6) of the microswitch from normally closed contact 122 to its normally open contact 120 (FIG. 6). The purge and refill cycle is now begun. Inertia of the pistons and system inertia permit the flange 214 to continue its movement until positively stopped by the step 218.

This condition prevails momentarily until the purge and refill cycle again moves the drive piston 24 to the left in the drawing. This movement allows the spring loaded pin 240 of the microswitch 92 to move the switch arm 90 (FIG. 6) to the left in the drawing thereby swinging the microswitch armature 120 back to its normally closed contact 122. When sufficient movement has occurred, the normally closed contact 122 is again closed and the purge portion of the purge and refill cycle ends. It is this small distance of travel of the pistons 24 and 26 from the step 218 to the left in the drawing until the microswitch contact 122 is again closed which controls the time during which purge occurs in the system as has been described. The distance of this travel is typically in the order of 8 mils or less depending on the adjustment of the microswitch.

The purge time is adjustable over a small range by pivoting the microswitch 92 about the screw 233. This is accomplished by the set screw 244 (FIG. 5) which tightens and holds the microswitch 92 in the desired rotational position.

While pistons having differential areas have been shown, it is to be understood they may have the same areas. In this event different pressures would be employed in the drive and sample cylinders. Furthermore, the sensing means need not be a microswitch. A reed switch operated by a magnet on the connecting rod 212 could provide the same differential action. Alternatively, capacitive, magnetic, or radiation response position sensors could be used to sense the rate of movement of the metering piston, i.e., the sample viscosity.

The purge may be accomplished with a fluid which term is deemed to include both liquids and gases. In the case of use with a gas chromatograph, a gas is generally preferred for purging.

The invention described provides a means of purging the discharge orifice and the end portion of the sample dischage lines after the sample is dispensed, for a period of time that is proportionate to the viscosity of the sample fluid. This insures the sample is accurately and quickly dispensed without unduly exposing the sample container to purge gas. This latter feature is particularly important in the field of gas chromatography.

While the invention has been disclosed herein in connection with certain embodiments and certain structural details, it is clear that changes, modifications or equivalents can be used by those skilled in the art.

What is claimed is:

1. A system for dispensing a sample fluid from a dispensing orifice in response to a start signal comprising, in combination:

a metering pump having a metering chamber of first adjustable volume, a feed line for supplying said fluid to said metering chamber from a pressurized source of supply, a discharge line for discharging said fluid from said metering chamber to said discharge orifice, a purge line for supplying purge fluid to said dispensing orifice, sensing means for providing a first signal upon the completion of said discharge from said metering chamber a second signal when said metering chamber has refilled to a finite volume.

drive means for alternately discharging said fluid from said metering chamber through said discharge line and dispensing orifice in response to said start signal and refilling said metering chamber with said fluid from said feed line in response to said first signal, and first fluid flow control means in said discharge and purge lines operative (a) in response to said start signal to couple said metering chamber to said dispensing orifice, (b) in response to said first signal to couple said purge line to said dispensing orifice, and (c) in response to said second signal to block all flow to said dispensing orifice, thereby to purge said orifice for a period of time proportional to the viscosity of said sample fluid.

2. A system according to claim 1 wherein said metering pump includes:

a metering cylinder, a drive cylinder, a piston in said metering cylinder defining said metering chamber, a piston in said drive cylinder operatively connected to said piston in said metering cylinder so that said pistons move in unison, and a drive fluid line for supplying pressurized fluid to said drive cylinder, thereby to drive the piston in said metering cylinder to discharge said sample fluid.

3. A system according to claim 2 wherein said sensing means is adapted to sense the position of said piston in said metering cylinder.

4. A system according to claim 3 wherein said sensing means is adapted to sense the position of said piston in said drive cylinder and thereby the position of said piston in said metering cylinder.

5. A system according to claim 4 wherein said source of supply and said drive cylinder are both connected to be pressurized by said drive fluid line and wherein said drive cylinder has a greater diameter than said metering cylinder.

6. A system according to claim 2 wherein said source of supply and said drive cylinder are both connected to be pressurized by said drive fluid line and wherein said drive cylinder has a greater diameter than said metering cylinder.

7. A system according to claim 2 wherein said drive means includes a second fluid flow control means in said drive fluid line and in said feed line operative (a) in response to said start signal to couple said drive fluid to said drive cylinder thereby to discharge said sample fluid from said metering pump and (b) in response to said first signal for venting said drive cylinder and coupling said feed line to said metering cylinder thereby to refill said metering chamber.

8. A system according to claim 7 wherein said purge line also is connected to be pressurized by said fluid.

9. A system according to claim 8 wherein said sensing means is adapted to sense the position of said piston in said drive cylinder and thereby the position of said piston in said metering cylinder.

10. A system for accurately dispensing a sample fluid through dispensing orifice in response to a start signal comprising, in combination:

a first means for discharging an adjustable volume of said fluid in response to said start signal, ing said fluid to said dispensing orifice, a discharge line connected to said first means for passing said fluid to said dispensing orifice, a purge fluid line for supplying purge fluid to said dispensing orifice, and valve means in said discharge and purge fluid lines for passing said volume of said sample fluid through and then purging said orifice with said purge fluid for a period of time proportional to the viscosity of said sample fluid.

11. A system according to claim 10 wherein said first means comprises:

a metering cylinder, a drive cylinder, a piston in said metering cylinder defining said metering chamber, a piston in said drive cylinder operatively connected to said piston in said metering cylinder so that said pistons move in unison, and a drive fluid line for supplying pressurized fluid to said drive cylinder, thereby to drive the piston in said metering cylinder to discharge said sample fluid.

12. A system according to claim 11 wherein said valve means includes sensing means operatively associated with said first means for generating first and second electrical signals according to the completion of said fluid discharge and the subsequent refilling of said piston in said metering cylinder, respectively, said valve means being responsive to said first signal to start the purge of said orifice and to said second signal to stop the purge of said orifice.

13. A system according to claim 12 which includes a source of pressurized gas and wherein said purge line and said drive line are connected to said source of pressurized gas.

14. A system according to claim 10 wherein said valve means includes sensing means for determining the viscosity of said sample fluid, and actuating means responsive to said sensing means for operating said valve means to purge said orifice for said period of time proportional to the viscosity of said sample fluid.

References Cited

UNITED STATES PATENTS

| 3,199,274 | 8/1965 | Norem et al. | 55—386 |
| 3,425,807 | 2/1969 | Levy | 55—386 X |

STANLEY H. TOLLBERG, Primary Examiner

U.S. Cl. X.R.

55—386

UNITED STATES PATENT OFFICE
CERTIFICATE OF CORRECTION

Patent No. 3,491,368  Dated January 20, 1970

Inventor(s) F. J. Debbrecht et al

It is certified that error appears in the above-identified patent and that said Letters Patent are hereby corrected as shown below:

Column 5, line 64, "16" should read -- 116 --;

Column 8, lines 39-40, "special" should read -- spacial --

Column 11, line 37, after "said" insert -- drive --; delete line 47.

SIGNED AND SEALED

JUN 23 1970

(SEAL)
Attest:

Edward M. Fletcher, Jr.
Attesting Officer

WILLIAM E. SCHUYLER, JR.
Commissioner of Patents